Jan. 7, 1958   M. L. CLEVETT, JR   2,818,622
BAG CLOSURE FASTENER
Filed Nov. 17, 1954
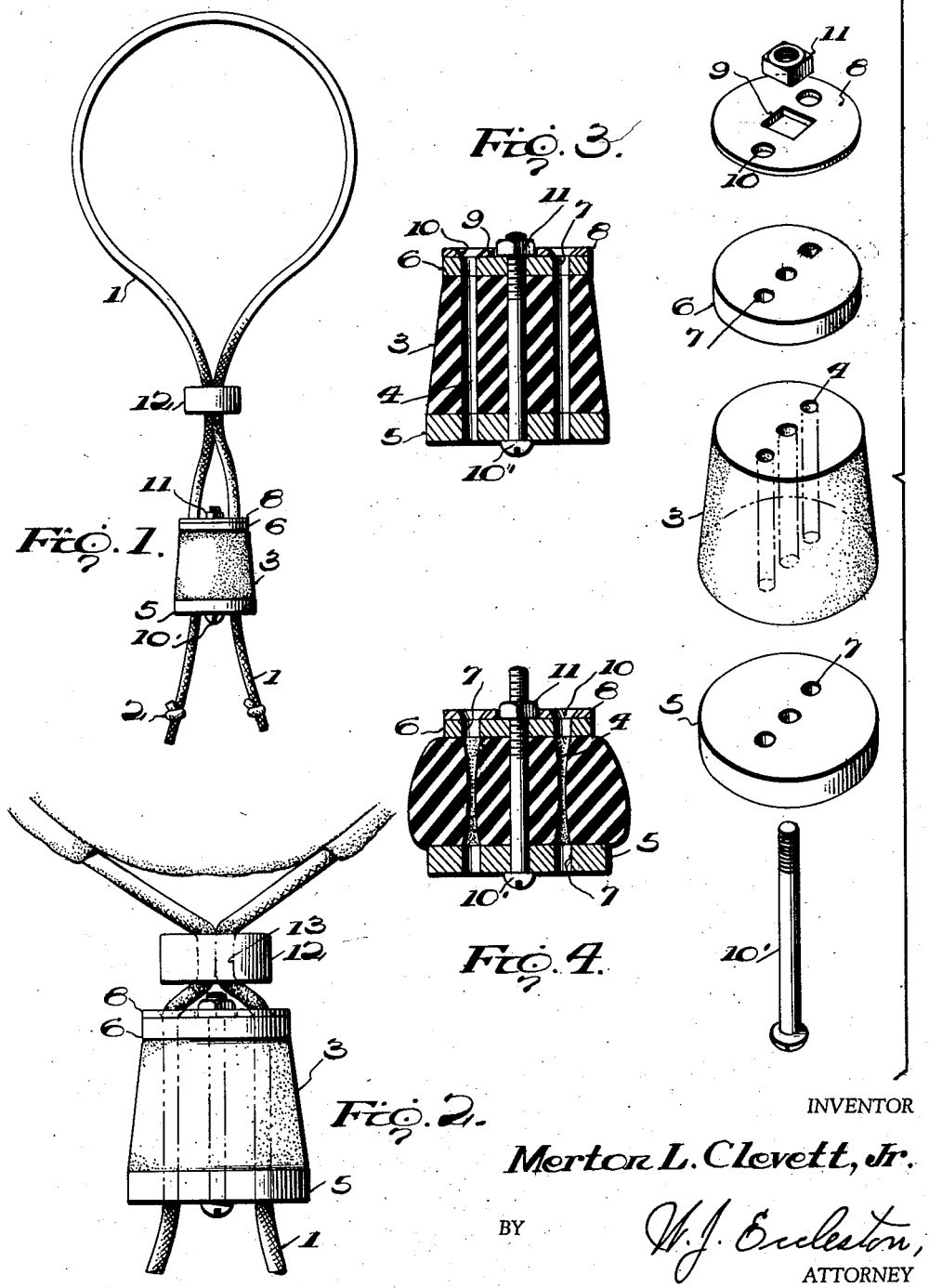
INVENTOR
Merton L. Clevett, Jr.
BY
ATTORNEY United States Patent Office 2,818,622
Patented Jan. 7, 1958

2,818,622

BAG CLOSURE FASTENER

Merton L. Clevett, Jr., East Natick, Mass., assignor to the United States of America as represented by the Secretary of the Army Application November 17, 1954, Serial No. 469,568

4 Claims. (Cl. 24—30.5)

(Granted under Title 35, U. S. Code (1952), sec. 266)

The invention described herein, if patented, may be manufactured and used by or for the Government for governmental purposes, without the payment to me of any royalty thereon.

The present invention relates to closure fasteners for bags such as rucksacks, and is an improvement on the structure shown in the application of Merton L. Clevett, Jr., and John S. Brown, Ser. No. 412,139, filed February 23, 1954, for Bag Closure Fastener.

In closure fasteners of this type the drawstrings or cords, through frequent use, tend to cause deterioration of the fastener by wear on the walls of the passageways of the elastic member, and also by wear on the ends of the elastic member.

An object of the present invention consists in the provision of means for so adjusting the elastic element of the fastener, from time to time, that the enlargement of the passageways caused by wear may be compensated for by partly collapsing the walls thereof.

Another object of the invention resides in the provision of adjusting means so located that they will guard the ends of the elastic element against wear by repeated use of the cords in opening and closing the bag.

In the accompanying drawings:

Figure 1 is a plan view of the drawstring and fastener, apart from a bag to which it is to be attached;

Figure 2 is a fragmentary view, somewhat enlarged, showing the drawstring applied to a bag and drawn into closing position;

Figure 3 is a longitudinal sectional view through one portion of the fastener means;

Figure 4 is a similar view in which the particular fastener has been somewhat worn and has been adjusted to reinstate its effectiveness; and, Figure 5 is an exploded perspective view showing the various elements of that portion of the fastener disclosed in Figures 3 and 4.

Referring to the drawings in greater detail the numeral 1 indicates a conventional drawstring provided with knots 2 on its ends. This drawstring of course is intended to be threaded through an annular channel, such as provided by a hem, in the mouth of a rucksack or other bag.

The main portion of the fastener consists of the elastic member 3 provided with the spaced longitudinal passageways 4 for the drawstring, and the washers 5 and 6, preferably formed of laminated fabric phenolic resin, which engage the ends of the elastic member 3 and are provided with passageways 7 forming extensions of the passageways 4 in the elastic member. These washers may be fixedly secured to the respective ends of the elastic member 3 by bonding or otherwise. Mounted on the exterior face of the washer 6 is a plate 8 provided with an opening 9 corresponding in size and shape to a fastening nut to be later referred to, and with openings 10 corresponding to the openings 7 in the washers.

As hereinbefore indicated continued use of a closure member of this type tends to enlarge the passageways 4 through which the drawstring operates. In order to cure this defect a bolt 10' is passed through central openings in the washers 5 and 6, plate 8 and elastic member 3, and receives a nut 11 on its threaded end. This nut may be seated in the opening 9 in plate 8 and by rotating the bolt as the passageways of the body member 3 become worn, the walls will be forced to a somewhat collapsed position as clearly indicated in Figure 4 so as to provide the necessary friction between the drawstring and the walls of the passageways 4. Moreover, by providing this adjusting means in the form of sturdy washers at each end of the elastic member 3 wear on the ends of the elastic member itself due to repeated operation of the drawing, is avoided.

The other element of the fastening means, which is also fully shown and described in copending application Ser. No. 412,139, referred to above, is indicated by the numeral 12 and is of disk shape. This element is of somewhat smaller diameter than the diameter of the element 3 and is provided with a central passageway 13 of sufficient dimensions to permit the two sections of the drawstring to slide therethrough as indicated in Figures 1 and 2.

The disk 12 is of somewhat smaller external diameter than the other element of the fastening means so as to facilitate manipulation of the fastener with gloved hands, if necessary, and as described in the copending application referred to above as the drawstring is drawn tight so as to gather tightly together the sections of the mouth of the bag the member 12 is forced inwardly toward the bag as far as possible. Thereafter the elastic member 3 with its adjustable washers 5 and 6 is forced into close relationship to the member 12 so as to lock the sections of the drawstring against movement.

The locking of the drawstring is caused in part by forcing the element 3 into close proximity to the element 12 thereby causing the two sections of the string to be bent into more or less S-shape curves as a result of the obtuse angles formed by the sections of the string above and below the member 12. The locking of the drawstring is also caused in part by the narrowness of the openings 4 in the member 3, either as originally constructed or as adjusted by the nut 11 after wear caused by usage, and to the frictional resistance of wall 13 to the passage of the string sections jointly.

From the foregoing description taken in connection with the accompanying drawings it will be apparent that I have devised a novel construction of bag closure of the drawstring type in which the locking means is highly efficient, is shielded against wear at its ends by means of the washers 5 and 6, and is adjustable to compensate for wear on the interior of the elastic member by merely tightening up on the bolt 10'.

In accordance with the patent statutes, I have described what I consider to be the preferred form of the invention but it is intended that various minor structural changes be included within the scope of the appended claims.

I claim:

1. In combination with the drawstrings of a bag or the like, a fastener including an elastic member having a pair of spaced elongated openings normally of a diameter to snugly and slidably receive the respective ends of the drawstring, and means for compressing the elastic member endwise, said means including members engaging the opposite ends of the elastic member.

2. In combination with the drawstrings of a bag or the like, a fastener including an elastic member having a pair of spaced elongated openings normally of a diameter to snugly and slidably receive the respective ends of the drawstring, washers on the opposite ends of said elastic member, and means for drawing said washers toward each other for compressing the elastic member endwise and collapsing the walls of the openings.

3. In combination with the drawstrings of a bag or the like, a member having a central opening through which the free ends of the drawstring are slidable, a second member of elastic material having a pair of spaced openings of a diameter to snugly and slidably receive the respective ends of the drawstring, washers on the opposite ends of said second member having spaced openings corresponding with the openings in the second member, and means for drawing said washers toward each other to partly collapse the walls of the openings in the second member.

4. In combination with the drawstrings of a bag or the like, a member having a central opening through which the free ends of the drawstring are slidable, a second member of elastic material having a pair of spaced openings of a diameter to snugly and slidably receive the respective ends of the drawstring, washers on the opposite ends of said second member having spaced openings corresponding with the openings in the second member, and a nut threaded to said bolt for drawing said washers toward each other to partly collapse the walls of the openings in the second member.

References Cited in the file of this patent

UNITED STATES PATENTS

| | | |
|---|---|---|
| 865,531 | Robinson | Sept. 10, 1907 |
| 1,080,013 | Landin | Dec. 2, 1913 |
| 1,916,937 | Schlaburg | July 4, 1933 |